US011472741B2

(12) United States Patent
Sampson

(10) Patent No.: US 11,472,741 B2
(45) Date of Patent: *Oct. 18, 2022

(54) CEMENTITIOUS COMPOSITION WITH HIGH BOND STRENGTH TO BOTH ASPHALT AND CEMENT BASED MATERIALS

(71) Applicant: Paul Sampson, Monkton, MD (US)

(72) Inventor: Paul Sampson, Monkton, MD (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/809,265

(22) Filed: Mar. 4, 2020

(65) Prior Publication Data

US 2020/0407277 A1    Dec. 31, 2020

Related U.S. Application Data

(63) Continuation-in-part of application No. 16/594,822, filed on Oct. 7, 2019, now Pat. No. 11,155,498, which is a continuation of application No. 16/583,819, filed on Sep. 26, 2019, now abandoned.

(60) Provisional application No. 62/738,257, filed on Sep. 28, 2018.

(51) Int. Cl.
| | |
|---|---|
| C04B 28/04 | (2006.01) |
| C04B 28/06 | (2006.01) |
| C04B 18/14 | (2006.01) |
| C04B 14/08 | (2006.01) |
| C04B 14/30 | (2006.01) |
| C04B 18/08 | (2006.01) |
| C04B 24/04 | (2006.01) |
| C04B 24/06 | (2006.01) |
| C04B 111/00 | (2006.01) |

(52) U.S. Cl.
CPC .............. *C04B 28/04* (2013.01); *C04B 14/08* (2013.01); *C04B 14/30* (2013.01); *C04B 18/08* (2013.01); *C04B 18/141* (2013.01); *C04B 24/04* (2013.01); *C04B 24/06* (2013.01); *C04B 28/065* (2013.01); *C04B 2111/0075* (2013.01); *C04B 2201/50* (2013.01)

(58) Field of Classification Search
CPC ......... C04B 14/08; C04B 14/30; C04B 18/08; C04B 18/141; C04B 24/04; C04B 24/06; C04B 28/04; C04B 28/065; C04B 2111/0075; C04B 2201/50
See application file for complete search history.

(56) References Cited

U.S. PATENT DOCUMENTS

| | | |
|---|---|---|
| 4,313,763 A | 2/1982 | Turpin, Jr. |
| 6,514,595 B1 | 2/2003 | Sprouts |
| 7,914,685 B2 | 3/2011 | Constantz et al. |
| 8,519,016 B2 | 8/2013 | Perez-Pena |
| 8,551,241 B2 | 10/2013 | Perez-Pena |
| 8,562,736 B2 | 10/2013 | Gill |
| 8,580,030 B2 | 11/2013 | Kanduth et al. |
| 8,765,845 B2 | 7/2014 | Biasotti et al. |
| 8,864,901 B2 | 10/2014 | Lloyd et al. |
| 9,090,506 B2 | 7/2015 | Perez-Pena |
| 10,221,097 B1 | 3/2019 | Al-Kutti et al. |
| 2004/0187740 A1 | 9/2004 | Timmons |
| 2004/0211342 A1 | 10/2004 | Sprouts et al. |
| 2007/0056479 A1 | 3/2007 | Gray |
| 2011/0293954 A1 | 12/2011 | Kao et al. |
| 2012/0227630 A1 | 9/2012 | Gray |
| 2017/0166481 A1* | 6/2017 | Dubey ................. C04B 24/2676 |
| 2018/0050963 A1* | 2/2018 | Hesse ..................... C04B 14/06 |
| 2018/0162777 A1* | 6/2018 | White ..................... C04B 18/08 |

FOREIGN PATENT DOCUMENTS

| | | | |
|---|---|---|---|
| CN | 105819798 A | * 8/2016 | |
| CN | 105819798 A | 8/2016 | |
| EP | 2067753 A1 | 6/2009 | |
| EP | 2172437 A1 | * 4/2010 | ......... C04B 40/0032 |
| EP | 2714746 A1 | 4/2014 | |
| EP | 2722319 A2 | * 4/2014 | ............. C04B 28/06 |
| KR | 20050041439 A | 5/2005 | |
| KR | 10-20180060672 A | * 6/2018 | |
| KR | 1020180060672 A | 6/2018 | |
| WO | 2008089481 A1 | 7/2008 | |
| WO | 2012127067 A2 | 9/2012 | |
| WO | WO-2015095778 A1 | * 6/2015 | ........... C04B 28/065 |
| WO | 2017093703 A1 | 6/2017 | |

OTHER PUBLICATIONS

Federal Highway Administration; "User Guidelines for Waste and Byproduct Materials in Pavement Construction"; Research Publications; Accessed on: Nov. 30, 2020; https://www.fhwa.dot.gov/publications/research/infrastructure/structures/97148/toc.cfm; Mar. 8, 2016.
Wikipedia; "Pozzolan"; Accessed on: Nov. 22, 2020; https://en.wikipedia.org/wiki/Pozzolan; Jul. 9, 2020.
International Search Report and Written Opinion of the International Searching Authority; Application No. PCT/US20/52195; Completed: Nov. 30, 2020; dated Jan. 6, 2021; 11 Pages.
Socrates, Ioannou, et al.: "Performance characteristics of concrete based on a ternary calcium sulfoaluminate-anhydrite-fly ash cement". Cement and Concrete Composites vol. 55, published Jan. 2015, pp. 196-204. https://doi.org/10.1016/j.cemconcomp.2014.08.009 9 Pages.
U.S. Office Action; U.S. Appl. No. 16/594,822; dated Jun. 15, 2021; 1 Page.
International Preliminary Report on Patentability; Application No. PCT/US20/052195; Completed: Jan. 4, 2022; 31 Pages.

* cited by examiner

Primary Examiner — Anthony J Green
(74) Attorney, Agent, or Firm — Whitmyer IP Group LLC

(57) ABSTRACT

A cementitious composition of one embodiment, according to the present teaching, includes, but is not limited to, a Portland cement, and at least one other cement from a group comprising, but not limited to, calcium sulfoaluminate cement, a calcium aluminosilicate cement, and calcium aluminate, wherein the Portland cement has a content of at least 20 percent based on the total weight of the non-Portland hydratable cement powder, wherein the cementitious composition bonds to asphalt.

7 Claims, 6 Drawing Sheets

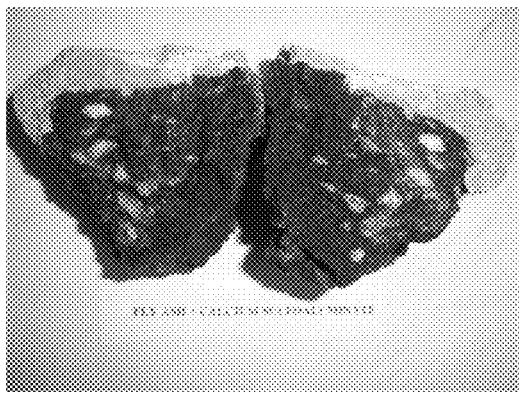
Figure 6: Bond between Asphalt and Fly Ash + Calcium SulfoAluminate
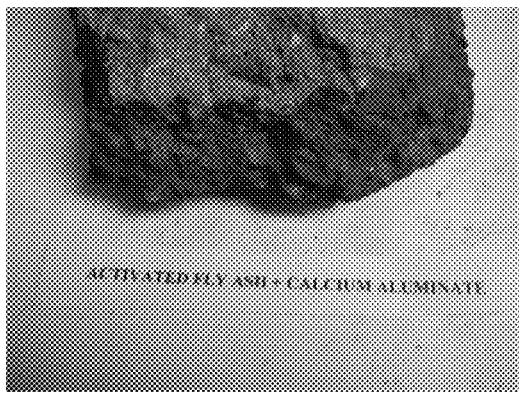
Figure 7: Bond between Asphalt and Activated Fly ash + Calcium Aluminate
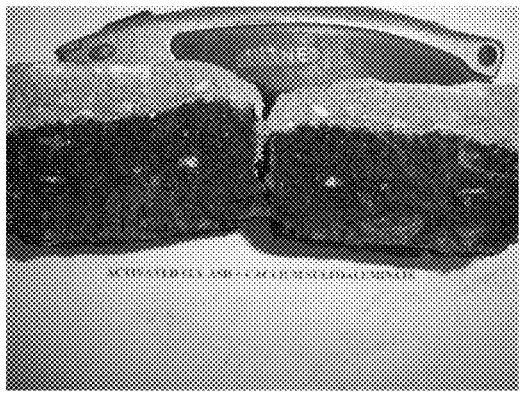
Figure 8: Bond between Asphalt and Activated Fly Ash + Calcium Sulfoaluminate

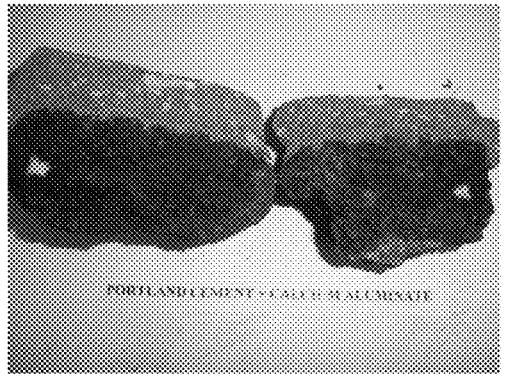
Figure 9: Bond between Asphalt and Portland Cement + Calcium Aluminate
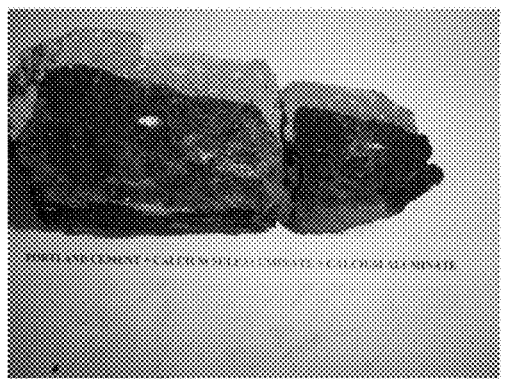
Figure 10: Bond between Asphalt and Portland Cement + Calcium Aluminate + Calcium Aluminosilicate
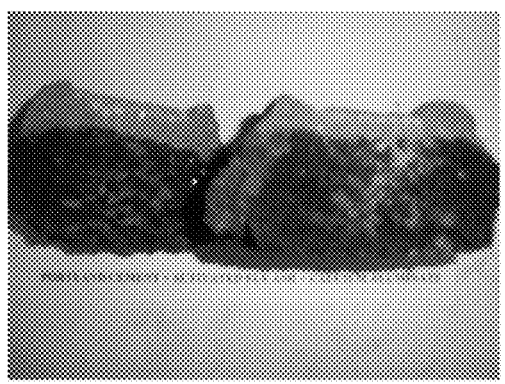
Figure 11: Bond between Asphalt and Portland cement + Activated Fly Ash + Calcium Aluminate

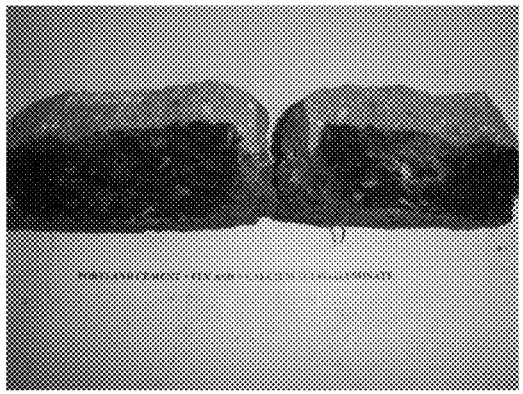
Figure 12: Bond between Asphalt and Portland Cement + Fly Ash + Calcium SulfoAluminate
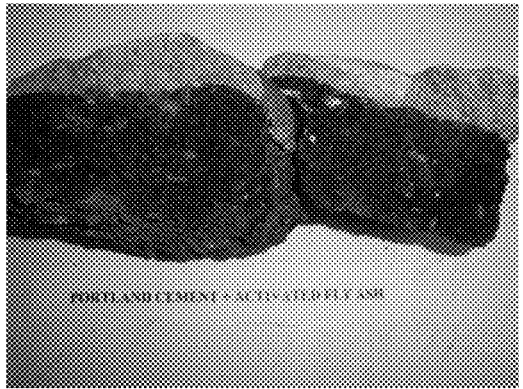
Figure 13: Bond between Asphalt and Portland Cement + Activated Fly Ash

CEMENTITIOUS COMPOSITION WITH HIGH BOND STRENGTH TO BOTH ASPHALT AND CEMENT BASED MATERIALS

CROSS REFERENCE TO RELATED APPLICATIONS

This application is a continuation-in-part of U.S. application Ser. No. 16/594,822 filed on 7 Oct. 2019, now U.S. Pat. No. 11,155,498, which is a continuation of U.S. application Ser. No. 16/583,819 filed on 26 Sep. 2019, which claims the benefit of U.S. Provisional Application No. 62/738,257 filed on 28 Sep. 2018.

TECHNICAL FIELD

The present teaching relates generally to a cementitious composition, and more precisely to provide a permanent repair product which bonds to both asphalt and cement based roadway and walkway surfaces.

BACKGROUND

It is generally believed that fly ash, calcium aluminate, calcium sulfoaluminate, and Portland based hydraulic cements do not bond adequately to asphalt to be used as repair products. Most repair products are designed to be applied to either asphalt or cementitious substrates, but are not capable of bonding adequately to both.

Portland cement is hydraulic cement produced by pulverizing clinkers which consist essentially of hydraulic calcium silicates, usually containing one or more of the forms of calcium sulfate as an inter ground addition. It consists of at least two-thirds by mass of calcium silicates (3 CaO. SiO2 and 2 CaO.SiO2), the remainder consisting of aluminum- and iron containing clinker phases and other compounds. The ratio of CaO to SiO2 shall not be less than 2.0. The magnesium oxide content shall not exceed 5.0% by mass.

Non-Portland cement is a high resistance, sustainable cement with the addition of raw materials such as: calcium sulfoaluminate, alkali aluminosilicates, calcium aluminate and certain hydrocarbons.

Previous cementitious compositions comprise either multiple types of cement or only a single type of cement. These mixtures are formulated to achieve a balance of properties (such as set time, compressive strength, shrinkage, and chemical resistance) suited to a particular application. However, each previous composition, whether made of a multiple or single types of cement, come with their own set of challenges.

Two component polymer based materials require on-site mixing of the resin and hardener in precise ratios in order to achieve the targeted performance. Epoxy, polyurea, and polyester resins are the most common in use and are typically supplied in pre-measured packaging to reduce the potential of the end user mixing the proportions incorrectly. The directions often state that to ensure proper performance, mix the entire contents of the packaging. This often results in wasted excess material and associated higher costs. Another negative aspect is that frequently the aggregate is packaged separately and must be mixed in a secondary step, which adds to the labor time on-site. Still another negative aspect is that the polymers used are not water based and thus the tool and on-site clean up requires flammable solvents or aggressive detergents whose run-off may contaminate adjacent soil and waterways.

Single component polymer compositions are moisture cured and designed to simplify the process for the end user by simply adding water once the material is placed. They have the disadvantage of short shelf life due to moisture contamination during manufacturing and packaging, particularly when produced on high humidity days. Once the packaging is opened, any unused material will be exposed to atmospheric moisture, resulting in the curing and hardening in the packaging, even after resealing. The end result is that the product is susceptible to hardening in the packaging either from the factory over time or once opened, rendering it useless, instilling cost losses, and yielding waste material.

Prior to the present teaching, Portland Cement, calcium sulfoaluminate, calcium aluminate, calcium aluminosilicate, and fly ash cements do not bond to asphalt. Prior to the present teaching, the high strength cement, mortar, and concrete disclosed in U.S. Pat. No. 8,016,937 by Schumacher, Patel, Sampson, and Riley, explicitly has less than 20% Portland content in the hydratable cement portion of the compositions. None of the composition examples described therein contain Portland cement or calcium sulfoaluminate cement. Further, this composition does not provide adequate bonding to asphalt.

Prior to the present teaching, it is known to use fly ash in Portland cement compositions as a filler material. Brook, et. al. in U.S. Pat. No. 5,556,458 discloses that at least 20% Portland cement is needed to overcome the low early strength of their alkali earth metal salt activated fly ash cement compositions with calcium aluminate used for compensating autogenous shrinkage. Just like the other prior art, this composition does not provide adequate bonding to asphalt.

Prior to the present teaching, it is generally believed that fly ash, calcium aluminate, calcium sulfoaluminate, and Portland based hydraulic cements do not bond adequately to asphalt to be used as repair products.

Therefore, it would be beneficial to have a cementitious composition utilizing the synergistic effects of combining a particular blend of multiple types of cement, which provides a permanent repair product for both asphalt and cement based roadways and walkways without the negative attributes of previous cementitious compositions made up of cement blends.

SUMMARY

The needs set forth herein as well as further and other needs and advantages are addressed by the present embodiments, which is illustrate solutions and advantages described below.

The blended hydraulic cement composition of the present teaching may be formulated in the following manner. Each of the individual components may be added individually to the packaging and dry mixed in the packaging or on site prior to the addition of water. Each of the individual components may be pre-blended prior to packaging and the water added on site. The hydraulic cement may also have the aggregates incorporated into the packaging. Packaging may include plastic buckets, polyethylene lined Kraft paper bags, plastic bags, supersacks, and bulk totes, although not limited thereto.

The cementitious composition of the present teaching may be combined with fine and/or course aggregates as defined and recommended by the American Concrete Institute to produce a mortar, grout, or shotcrete.

The cementitious composition of the present teaching will permit the user to avoid being exposed to hazardous organic vapors, chemical burns, and thermal burns.

The cementitious composition of the present teaching will permit the user to avoid use of flammable solvents or corrosive detergents to clean tools and supplies, thus eliminating potential environmental damage caused by spills and washout runoff.

The cementitious composition of the present teaching forms a hardened cement when a sufficient amount of water is added to achieve the desired consistency and can be mixed until homogenous using either hand tools, drill mixer, rotary drum mixer, mortar mixer, grout pump, auger, sprayer, or shotcrete mixer, although not limited thereto.

The cementitious composition of the present teaching may be placed onto a cement, concrete, macadam, brick, compacted aggregate, compacted soil, asphalt substrate(s), although not limited thereto, prior to hardening, consolidating the composition, surface finishing the composition, and allowing the composition to cure.

The cured composition of the present teaching can be used to form a road surface, walkway, vertical barrier, wall, flooring, decking, cast articles, or repairs thereof, although not limited thereto.

The composition of the present teaching forms a bond to the substrate that is stronger than the substrate.

The cementitious composition of one embodiment, according to the present teach, includes a Portland cement, and at least one other cement from a group comprising calcium sulfoaluminate cement, a calcium aluminosilicate cement, and calcium aluminate cement, where the Portland cement has a content of at least 10 percent based on the total weight of the non-Portland hydratable cement powder, and where the cementitious composition bonds to asphalt.

In a further embodiment, the composition is free of latex bonding agents.

In a further embodiment, the at least one other cement is between 0.5 to 70 percent of the composition.

In a further embodiment, an additive selected from a group comprising retarders, shrinkage reducing agents, air entraining agents, aggregates, fillers, extenders, pigments, water reducers, fiber reinforcements, rheology modifiers, and set accelerators.

The cementitious composition of another embodiment, according to the present teaching, includes a Portland cement, at least one other cement from a group comprising a calcium aluminate cement, a calcium sulfoaluminate cement, a calcium aluminosilicate cement, a non-Portland hydratable cement powder, which includes a pozzolanic powder and has a calcium content expressed as oxides of at least 15 weight percent based on the total weight of the non-Portland hydratable cement powder, and an alkali salt, where the Portland cement has a content of at least 20 percent based on the total weight of the non-Portland hydratable cement powder.

In a further embodiment, the composition is free of latex bonding agents.

In a further embodiment, the at least one other cement content is between 0.5 and 70 percent of the composition.

In a further embodiment, the alkali salt content is between 0.1 and 10 percent of the composition.

In a further embodiment, an alkali ion of the alkali salt is selected from a group comprising lithium, sodium, potassium, magnesium, and calcium.

In a further embodiment, the alkali ion is in stoichiometric proportion with a hydrocarboxylic acid to form a pH neutral salt.

In a further embodiment, the hydrocarboxylic acid is selected from a group comprising citric, lactic, and propionic.

In a further embodiment, the pozzolanic powder is selected from a group comprising Class C Fly Ash, Class F Fly Ash, volcanic ash, diatomaceous earth, rice hull ash, opal, and a high free lime content powder.

In a further embodiment, the high free lime content powder is selected from a group comprising lime kiln dust, cement kiln dust, slag, granulated blast furnace slag cement, calcium oxide.

In a further embodiment, an additive selected from a group comprising retarders, shrinkage reducing agents, air entraining agents, aggregates, fillers, extruders, pigments, water reducers, fiber reinforcements, rheology modifiers, and set accelerators.

The cementitious composition of another embodiment, according to the present teaching, includes a non-Portland hydratable cement powder, which includes a pozzolonic powder and has a calcium content expressed as oxides of at least 15 weight percent based on the total weight percent of the non-Portland hydratable cement powder, an alkali salt, at least one other cement from a group comprising a calcium aluminate, a calcium sulfoaluminate cement, or a calcium aluminosilicate cement, where the non-Portland hydratable cement powder has a content of at least 10% on the total weight of the cementitious content, and where the cementitious composition bonds to asphalt.

In a further embodiment, the composition is free of bonding agents and Portland cement.

In a further embodiment, the at least two cement contents are between 0.5 and 90 percent of the composition.

In a further embodiment, the alkali salt content is between 0.1 and 10 percent of the composition.

In a further embodiment, an alkali ion of the alkali salt is selected from a group comprising lithium, sodium, potassium, magnesium, and calcium.

In a further embodiment, the alkali ion is in stoichiometric proportion with a hydrocarboxylic acid to form a pH neutral salt.

In a further embodiment, the hydrocarboxylic acid is selection from a group comprising citric, lactic, and propionic.

In a further embodiment, the pozzolonic powder is selected from a group comprising Class C Fly Ash, Class F Fly Ash, volcanic ash, diatomaceous earth, rice hull ash, opal, and high free lime content powder.

In a further embodiment, the high free lime content powder is selected from a group comprising lime kiln dust, cement kiln dust, slag, granulated blast furnace slag, calcium oxide.

In a further embodiment, an additive selected from a group comprising retarders, shrinkage reducing agents, air entraining agents, aggregates, fillers, pigments, water reducers, fiber reinforcements, rheology modifiers, and set accelerators.

The cementitious composition of another embodiment, according to the present teaching, includes at least two cements from a group comprising a calcium aluminate cement, a calcium sulfoaluminate cement, and a calcium aluminosilicate cement, where at least two cements comprise at least 10 percent of the composition, where the cementitious composition bonds to asphalt.

In a further embodiment, the cementitious composition is free of latex bonding agents, Portland cement, and a non-Portland hydratable cement powder selected from a group comprising fly ash, rice hull ash, opal, diatomaceous earth volcanic ash, ground blast furnace slag cement, and high free lime content powder.

In a further embodiment, an additive selected from a group comprising retarders, shrinkage reducing agents, air entraining agents, aggregates, fillers, pigments, water reducers, fiber reinforcements, rheology modifiers, and set accelerators.

Other embodiments of the composition are described in detail below and are also part of the present teachings.

For a better understanding of the present embodiments, together with other and further aspects thereof, reference is made to the detailed description.

BRIEF DESCRIPTION OF THE DRAWINGS

FIG. 6 shows a bond between asphalt and Fly Ash with calcium sulfoaluminate.

FIG. 7 shows a bond between asphalt and Activated Fly Ash with calcium aluminate.

FIG. 8 shows a bond between asphalt and Activated Fly Ash with calcium sulfoaluminate.

FIG. 9 shows a bond between asphalt and Portland cement with calcium aluminate.

FIG. 10 shows a bond between asphalt and Portland cement with calcium aluminate and with calcium aluminosilicate.

FIG. 11 shows a bond between asphalt and Portland cement with Activated Fly Ash and with calcium aluminate.

FIG. 12 shows a bond between asphalt and Portland cement with Fly Ash and with calcium sulfoaluminate.

FIG. 13 shows a bond between asphalt and Portland cement with Activated Fly Ash.

DETAILED DESCRIPTION

Figure 1:
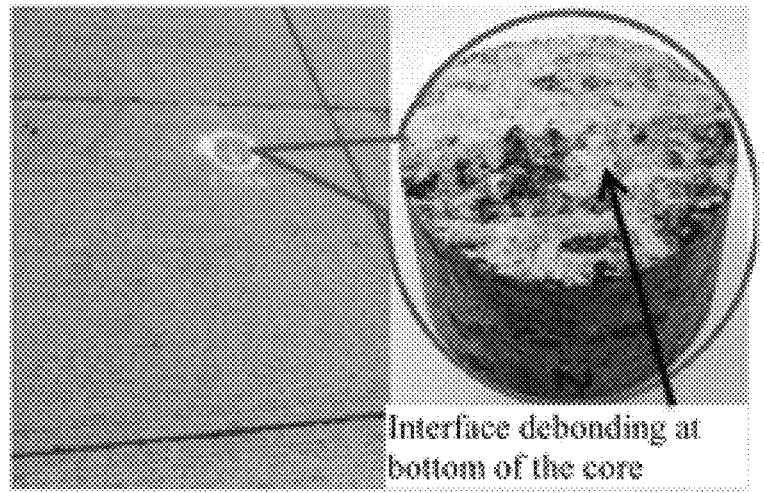
FIG. 1 shows a poor bond between a Portland concrete and an asphalt pavement.

This application discloses several numerical ranges in the text. The numerical ranges disclosed inherently support any range or value within the disclosed numerical ranges even though a precise range limitation is not stated verbatim in the specification because this present teaching can be practiced throughout the disclosed numerical ranges.

For the purpose of this teaching, the phrase "substantially free" shall mean present in an amount of less than 1 weight percent based on the total weight of the referenced composition.

For the purpose of this teaching, the term "Activated Fly Ash" is defined as Fly Ash in the presence of a carboxylic acid salt.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

Generally, all terms used in the claims are to be interpreted according to their ordinary meaning in the technical field, unless explicitly defined otherwise herein. All references to a/an/the element, composition, apparatus, component, means, step, etc., are to be interpreted openly as referring to at least one instance of the element, composition, apparatus, component, means, step, etc., unless explicitly stated otherwise. The steps of any method disclosed herein do not have to be performed in the exact order disclosed, unless explicitly stated. The use of "first," "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant does not intend any of the appended claims or claim elements to invoke 35 U.S.C. 112(f) unless the words "means for" or "step for" are explicitly used in the particular claim.

The cementitious composition of one embodiment, according to the present teaching, includes, but is not limited to, a Portland cement, and at least one other cement from a group comprising, but not limited to, calcium sulfoaluminate cement, a calcium aluminosilicate cement, and calcium aluminate, wherein the Portland cement has a content of at least 20 percent based on the total weight of the non-Portland hydratable cement powder, wherein the cementitious composition bonds to asphalt.

The cementitious composition of one embodiment, according to the present teaching, includes, but is not limited to, a Portland cement, a calcium aluminate cement or a calcium aluminosilicate cement, a non-Portland hydratable cement powder, which includes a pozzolanic powder and has a calcium content expressed as oxides of at least 15 weight percent based on the total weight of the non-Portland hydratable cement powder, an alkali salt, and the Portland cement has a content of at least 20 percent based on the total weight of the non-Portland hydratable cement powder.

The cementitious composition of one embodiment, according to the present teaching, includes, but is not limited to, a non-Portland hydratable cement powder, which includes a pozzolanic powder and has a calcium content expressed as oxides of at least 15 weight percent based on the total weight percent of the non-Portland hydratable cement powder, an alkali salt, at least two cements from a group comprising, but not limited to, a calcium aluminate cement, a calcium sulfoaluminate cement, and a calcium aluminosilicate cement, wherein the non-Portland hydratable cement powder has a content of at least 10% on the total weight of the cementitious content, wherein the cementitious composition bonds to asphalt.

The cementitious composition of one embodiment, according to the present teaching, includes, but is not limited to, at least two cements from a group comprising, but not limited to, a calcium aluminate cement, a calcium sulfoaluminate cement, and a calcium aluminosilicate cement, wherein at least two cements comprise at least 10 percent of the composition, wherein the cementitious composition bonds to asphalt.

According to one embodiment the cementitious composition is substantially free of latex bonding agents.

According to one embodiment the cementitious composition is substantially free of bonding agents and Portland cement.

According to one embodiment the cementitious composition is substantially free of latex bonding agents, Portland cement, and a non-Portland hydratable cement powder selected from a group comprising, but not limited to, fly ash, rich hull ash, opal, diatomaceous earth volcanic ash, ground blast furnace slag cement, and high free lime content powder.

According to one embodiment the calcium sulfoaluminate cement, or calcium aluminosilicate, or calcium aluminate content is between 0.5 and 70 percent of the cementitious composition.

According to one embodiment the calcium aluminate, calcium sulfoaluminate, or calcium aluminosilicate content is between 0.5 and 90 percent of the composition.

According to one embodiment the pozzolanic powder is selected from a group consisting of Class C Fly Ash which was produced from the combustion of sub-bituminous or lignite coal, Class C Fly Ash which was produced by co-combustion of coal with clay and slag, Class F Fly Ash which was produced via co-combustion of coal with clay and slag, volcanic ash, diatomaceous earth, rice hull ash, opal, combinations thereof, or a blend of a high free lime content powder, and wherein the pozzolanic powder contains less than 15 percent calcium oxide and the overall calcium content of the calcium oxides is greater than 15 percent.

According to one embodiment the high free lime content powder is selected from a group consisting of lime kiln dust, cement kiln dust, slag, granulated blast furnace slag cement, calcium oxide, or combinations thereof.

According to one embodiment the alkali salt comprises either an alkali metal ion or an alkaline earth metal ion and comprises between 0.1 and 10 percent of said cementitious composition.

According to one embodiment the alkali metal ion is selected from a group consisting of lithium, sodium, or potassium and said alkaline earth metal ion is selected from a group consisting of magnesium or calcium, or in combinations thereof, in stoichiometric proportion with a hydrocarboxilic acid to form a pH neutral salt.

According to one embodiment the hydrocarboxilic acid is selected from a group consisting of citric, lactic, propionic based, or combinations thereof.

According to one embodiment the cementitious composition further comprises an additive selected from a group consisting of retarders, shrinkage reducing agents (SRA), air entraining agents (AEA), aggregates, fillers or extenders, pigments, water reducers, fiber reinforcements, rheology modifiers, set accelerators, or combinations thereof.

According to one embodiment the retarder is selected from a group consisting of boric acid, sodium tetraborate, potassium tetraborate, boric oxide, sodium borate, potassium borate, borax pentahydrate, borax decahydrate, sulfate salts, sugars, sugar acids, lignins, or combinations thereof in total consisting of between 0.1 and 2.5 percent of said cementitious composition.

According to one embodiment the shrinkage reducing agents functions by expanding to offset the autogenous shrinkage of the Portland and pozzolanic materials, including certain compounds which can form ettringite in-situ, and/or metal oxides whose hydrates have a lower specific gravity than their oxides.

According to one embodiment the ettringite formation during hydration is the product of various combinations of calcium sulfate cement (CS), calcium aluminate cement (CA), calcium aluminosilicate (CAS), calcium sulfoaluminate cement (CSA), calcium sulfate hemihydrate, calcium sulfate, and/or aluminum sulfate.

According to one embodiment the shrinkage reducing agent functions as an inhibitor to moisture egress during hydration and is selected from a group consisting of silica fume, liquid glycol, neopentyl glycol, a liquid glycol adsorbed on a surface of a solid carrier, calcium stearate, magnesium stearate, or a combination thereof.

According to one embodiment the shrinkage reducing agent further comprises a fine particulate metal powder selected from a group of alkali metals, alkali earth metals, aluminum, titanium, zinc, iron, magnesium, manganese, nickel, zirconium, vanadium, or combinations thereof which will react with water to generate hydrogen or oxygen gas.

According to one embodiment the aggregate is selected from a group consisting of pea gravel, river rock, sand, crushed rock, or combinations thereof.

According to one embodiment the filler or extender is selected from a group consisting of ground glass, cenospheres, aluminum oxide, ground nutshells, ground rubber, fine ground hardened Portland cement, fine ground Portland concrete, find ground ceramic, fine ground clay brick, calcium carbonate, nephylene syenite, aluminum trihydrate, pumice, wollastonite, Class F fly ash, kaolin, meta-kaolin, silicon dioxide, dolomite, perlite, slate, other fine ground types of stone, or combinations thereof.

According to one embodiment the pigment is selected from a group consisting of metal oxides including iron oxides, titanium dioxide, or combinations thereof.

According to one embodiment the water reducer is selected from a group consisting of lignin, melamine, naphthalene, polycarboxylate, acrylic latex, or combinations thereof.

According to one embodiment the fiber reinforcement is selected from a group of fibers consisting of nylon, polypropylene, Kevlar, steel, polyester, polyamide, acrylamide, basalt, e-glass, s-glass, or combinations thereof, in various lengths between 0.125 and 2 inches in length.

According to one embodiment the rheology modifier is selected from a group consisting of lignin, melamine, naphthalene, polycarboxylate, acrylic latex, silica fume, fumed silica, precipitated silica, polyethylene oxide, or combinations thereof.

According to one embodiment the set accelerator is selected from a group consisting of lithium carbonate, lithium hydroxide monohydrate, lithium nitrate, lithium fluoride, lithium chloride, lithium borate, lithium acetate, lithium citrate, lithium lactate, lithium gluconate, or combinations thereof.

According to one embodiment the Portland cement, non-Portland cement, calcium aluminate cements, calcium aluminosilicate cements, and calcium sulfoaluminate cement elements of the cementitious composition are free of the following materials: citric acid; lactic acid; alkali metal; metal carbonate; amine based activators; caustic compounds, such as sodium hydroxide, lithium hydroxide, and potassium hydroxide; geopolymers; non-aqueous thermoset organic polymers, such as polyurethane, epoxy, polyurea, and polyacrylates; bitumen; asphalt; asphalt polymer blends; chloride, iodide, bromide, and fluoride ions and salts; and combinations thereof.

According to one embodiment the cementitious composition can be used to repair roadways, sidewalks, foot paths, driveways, foundations, masonry work, joints for drains and pipes, water tightness of a structure, floors, roofs, beans, stairs, pillar, fencing posts, bridge, culverts, dams, tunnels, wells, water tanks, lighthouses, tennis courts, lamp posts, although not limited thereto.

According to one embodiment the cementitious composition bonds to asphalt.

Referring now to FIG. 1, the figure shows the lack of a good bond between a Portland concrete over asphalt pavement. FIG. 1 shows the current problem in cementitious compositions.

Figure 2:
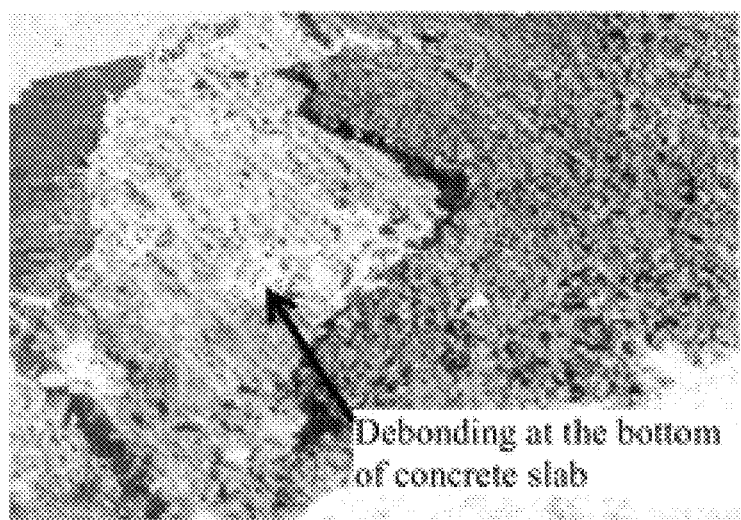
FIG. 2 shows a separation of a concrete slab from a Portland concrete substrate.

Referring now to FIG. 2, the figure shows the bond separation at the bottom of a concrete slab from a Portland concrete substrate.

Figure 3:
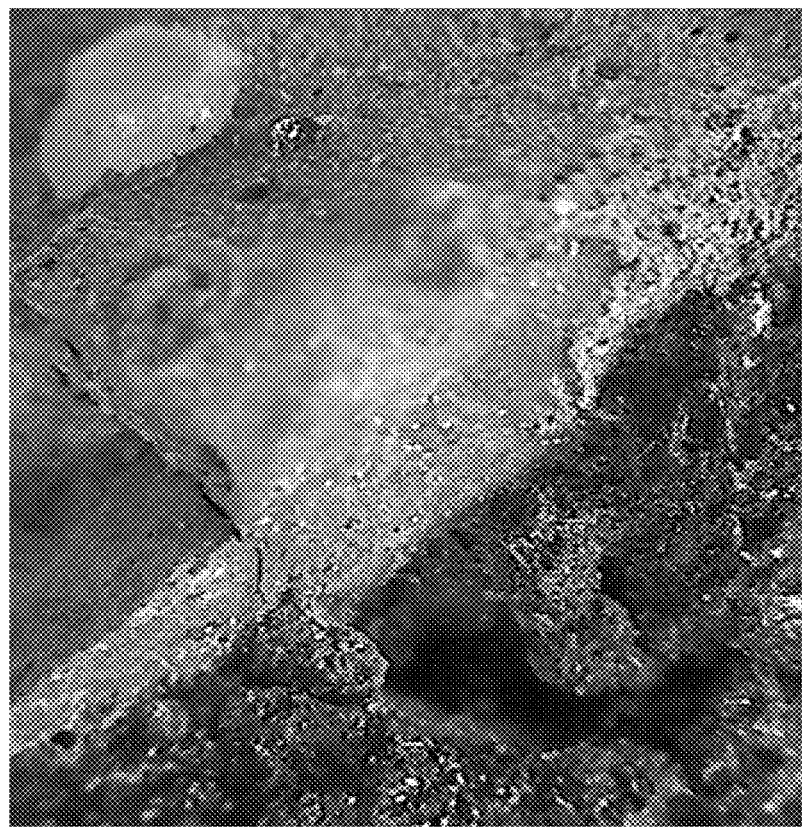
FIG. 3 shows a bond between the present teaching and asphalt pavement.

Referring now to FIG. 3, the figure shows the cementitious composition according to the present teaching bonding to asphalt pavement in the upper left corner after outdoor exposure. The surface area was struck with repeated hammer blows in an unsuccessful attempt to delaminate the two dissimilar materials. There is a diagonal crack in the present teaching layer originating in the left center edge of the photograph. The crack was created by the sharp impact which caused the ejection of some aggregate in the asphalt layer. The interface bond remained intact demonstrating that the bond is stronger than either of the two dissimilar materials as evidence by failure within each material but not at the bond.

Figure 4:
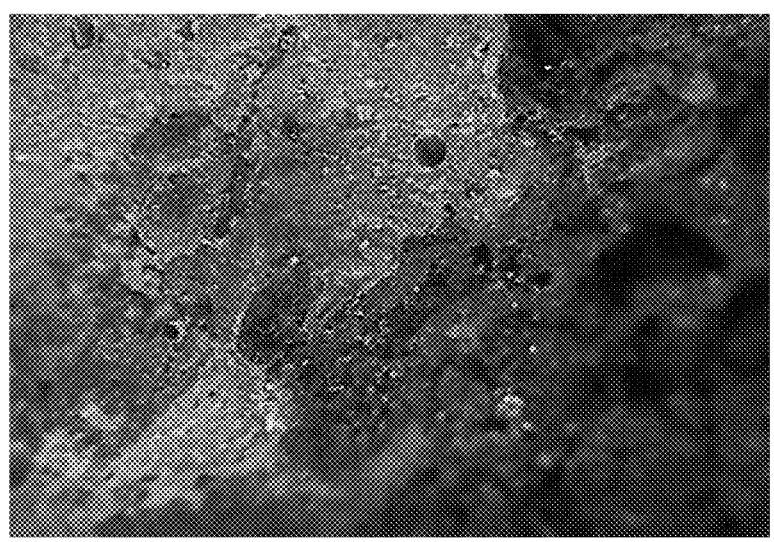
FIG. 4 shows an enlarged image of FIG. 3.

Referring now to FIG. 4, the figure shows an enlargement of the interface fracture surface section from FIG. 3. The figure shows the full contact between the two dissimilar materials even after the adjacent areas receiving fracture inducing forces.

Figure 5:
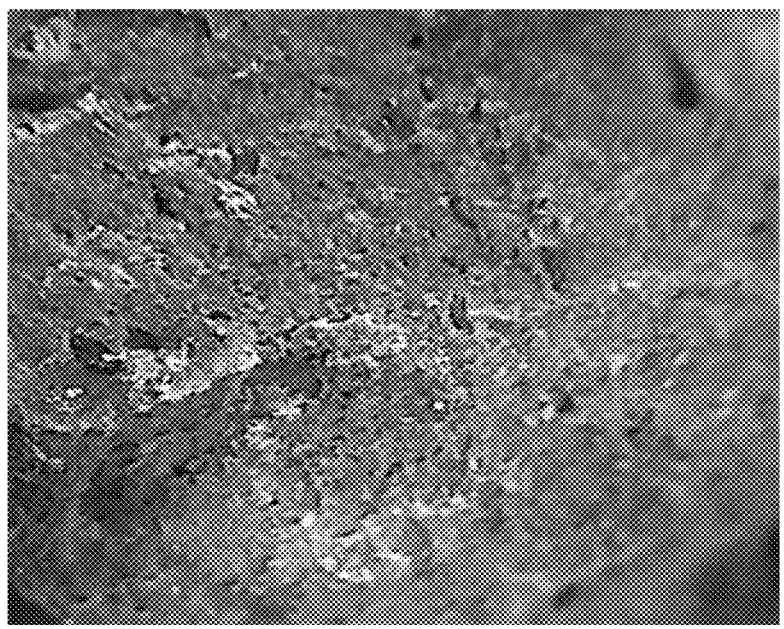
FIG. 5 shows a bond between the present teaching and a Portland cement mortar.

Referring now to FIG. 5, the figure shows the cementitious composition according to the present teaching bonded to a Portland cement mortar after outdoor exposure. The area was struck with repeated hammer blows in an unsuccessful attempt to delaminate the two dissimilar materials. The present teaching is depicted in the upper portion of the photograph and the Portland mortar is in the lower portion of the photograph.

Referring now to FIG. 6, the figure shows the cementitious composition comprising Fly Ash and calcium sulfoaluminate bonding to asphalt.

Referring now to FIG. 7, the figure shows the cementitious composition comprising Activated Fly Ash and calcium aluminate bonding to asphalt.

Referring now to FIG. 8, the figure shows the cementitious composition comprising Activated Fly Ash and calcium sulfoaluminate bonding to asphalt.

Referring now to FIG. 9, the figure shows the cementitious composition comprising Portland cement and calcium aluminate bonding to asphalt.

Referring now to FIG. 10, the figure shows the cementitious composition comprising Portland cement, calcium aluminate, and calcium aluminosilicate bonding to asphalt.

Referring now to FIG. 11, the figure shows the cementitious composition comprising Portland cement, Activated Fly Ash, and calcium aluminate bonding to asphalt.

FIGS. 3, 4, and 5 show that the bond between the present teaching and substrates remained intact through several thermal and freeze and thaw cycles.

The above description is presented to enable a person skilled in the art to make and use the present teaching, and is provided in the context of a particular application and its requirements. Various modifications to the preferred embodiments will be readily apparent to those skilled in the art, and the generic principles defined herein may be applied to other embodiments and applications without departing from the spirit and scope of the present teaching. Thus, this present teaching is not intended to be limited to the embodiments shown, but is to be accorded the widest scope consistent with the principles and features disclosed herein.

What is claimed is:

1. A cementitious composition comprising:
   a Portland cement;
   at least one other cement selected from the group consisting of a calcium aluminosilicate cement and calcium aluminate;
   a non-Portland hydratable cement powder, which includes a pozzolanic powder and has a calcium content expressed as oxides of at least 15 weight percent based on the total weight of the non-Portland hydratable cement powder; and
   an alkali salt;
   wherein the Portland cement has a content of at least 20 percent based on the total weight of the non-Portland hydratable cement powder;
   wherein the alkali salt content is between 0.1 and 10 percent by weight of the cementitious composition, an alkali ion of the alkali salt is selected from a group consisting of lithium, sodium, potassium, magnesium, and calcium;
   wherein the alkali ion is in stoichiometric proportion with a hydrocarboxylic acid to form a pH neutral salt.

2. The cementitious composition of claim 1, wherein the composition is free of latex bonding agents.

3. The cementitious composition of claim 1, wherein the at least one other cement content is between 0.5 and 70 percent by weight of the composition.

4. The cementitious composition of claim 1, wherein the hydrocarboxylic acid is selected from the group consisting of citric, lactic, and propionic.

5. The cementitious composition of claim 1, wherein the pozzolanic powder is selected from the group consisting of Class C Fly Ash, Class F Fly Ash, volcanic ash, diatomaceous earth, rice hull ash, opal, and a high free lime content powder.

6. The cementitious composition of claim 5, wherein the high free lime content powder is selected from the group consisting of lime kiln dust, cement kiln dust, slag, granulated blast furnace slag cement, and calcium oxide.

7. The cementitious composition of claim 1, further comprising an additive selected from the group consisting of retarders, shrinkage reducing agents, air entraining agents, aggregates, fillers, extruders, pigments, water reducers, fiber reinforcements, rheology modifiers, and set accelerators.

* * * * *